United States Patent [19]

Copeland

[11] 4,017,397

[45] Apr. 12, 1977

[54] FILTER DEVICE FOR DIESEL ENGINES

[76] Inventor: Shannon B. Copeland, 3104 Scenic Drive, Modesto, Calif. 95355

[22] Filed: Dec. 2, 1974

[21] Appl. No.: 528,679

[52] U.S. Cl. .............................. 210/238; 210/119; 210/305; 210/311; 210/444; 210/446
[51] Int. Cl.$^2$ ......................................... B01D 27/08
[58] Field of Search ............ 210/94, 119, 133, 305, 210/306, 311, 320, 443, 444, 445, 446, 448, 238

[56] References Cited

UNITED STATES PATENTS

| 1,197,634 | 9/1916 | Hull | 210/305 |
| 1,690,564 | 11/1928 | Ward | 210/444 |
| 2,145,304 | 1/1939 | Hill | 210/94 |
| 2,200,795 | 5/1940 | Krieck | 210/94 |
| 2,389,431 | 11/1945 | Hallinan | 210/443 |
| 2,581,277 | 1/1952 | Morgenthaler | 210/311 X |
| 3,105,042 | 9/1963 | Roosa | 210/94 |
| 3,428,180 | 2/1969 | Rogers | 210/311 |
| 3,550,776 | 12/1970 | Hamilton | 210/416 F |
| 3,931,011 | 1/1976 | Richards et al. | 210/311 X |

FOREIGN PATENTS OR APPLICATIONS

| 643,172 | 9/1928 | France | 210/305 |
| 999,955 | 2/1952 | France | 210/338 |

Primary Examiner—Frank A. Spear, Jr.
Assistant Examiner—R. G. Mukai
Attorney, Agent, or Firm—John J. Leavitt

[57] ABSTRACT

Presented is a filter device for the fuel of diesel engines to remove water and entrained solids from the fuel, and which prevents the build-up of pockets of air within the filter device.

7 Claims, 2 Drawing Figures

FILTER DEVICE FOR DIESEL ENGINES

BACKGROUND OF THE INVENTION

Conventional diesel fuel filter devices have the disadvantage of permitting pockets of air to form within the filter body, with the consequence that the volumetric capacity of the filter is lessened. A further disadvantage is that a sudden surge of fuel will cause the air pocket to be entrained in the flow of fuel, resulting in a "flat spot" or "cough" in the engine at a time when it should be operating at full efficiency. Accordingly, one of the objects of the invention is to provide a diesel fuel filter device that is constructed in such a manner as to preclude the formation of air pockets within the filter device.

Another object of the invention is the provision of a fuel filter device for diesel engines which is designed to receive and which facilitates insertion of a replacement filter element.

Still another object of the invention is the provision of a diesel fuel filter device which is considerably more compact than conventional fuel filter devices, thus requiring less space for installaion and facilitating replacement of filter elements.

The invention possesses other objects and features of advantage, some of which, with the foregoing, will be apparent from the following description and the drawings. It is to be understood that the invention is not limited to the embodiment illustrated and described, since it may be embodied in various forms within the scope of the appended claims.

SUMMARY OF THE INVENTION

In terms of broad inclusion, the diesel fuel filter device of the invention includes a main body portion within which is contained the fuel filter element, a fuel expansion chamber into which the fuel flows directly from its source and wherein moisture and most entrained solids and entrained air are removed prior to passing the fuel through the filter element. At the opposite end of the main body from the expansion chamber and downstream from the filter element is an end cap or lid that tightly seals the open end of the main body while providing a fuel inlet passageway and a fuel outlet passageway arranged in coaxial relationship, with the outlet from the filter chamber being arranged so that entrained air is scavenged from the system and is not permitted to build up into a substantial pocket. Means are provided for simply and effectively binding the end cap, main body and fuel expansion chamber into a composite fuel-tight structure.

DESCRIPTION OF PREFERRED EMBODIMENT

Figure 1:
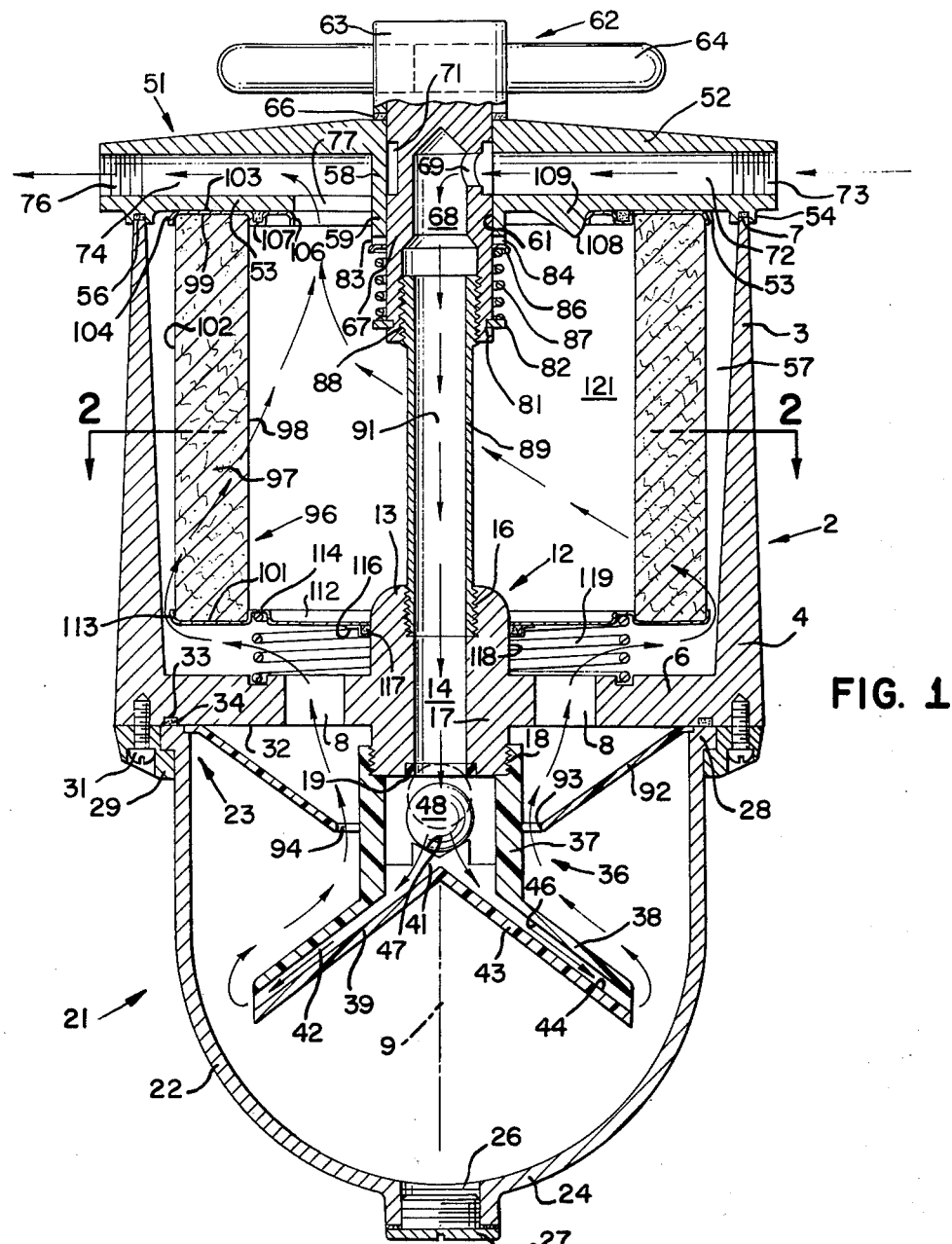
FIG. 1 is a vertical cross-sectional view through the longitudinal central axis of the fuel filter device.
Figure 2:
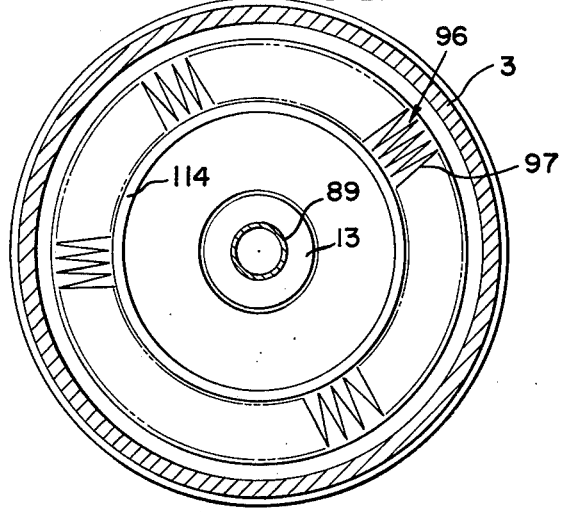
FIG. 2 is a horizontal cross-sectional view taken in a plane indicated by the line 2—2 in FIG. 1.

In terms of greater detail, the diesel fuel filter device of the invention comprises a die cast aluminum body designated generally by the numeral 2, and including generally cylindrical sidewalls 3 tapered as shown from the root 4, which are relatively heavy in cross-section and which are integral with a bottom end wall 6 that extends transversely and which is symmetrical with a central axis about which the generally cylindrical walls 3 are formed. From the base or bottom end wall 6, the generally cylindrical walls 3 extend away therefrom in a generally tapered cross-section and terminate in an end edge 7 as shown.

The transverse end wall 6 of the cup-shaped body 2 is provided with two or more apertures 8 for purposes which will hereinafter be explained. The apertures are spaced laterally from the central axis 9 of the device, and outboard from a central mounting hub designated generally by the numeral 12 and including an inwardly extending portion 13 having a central bore 14 having threads 16 on its inner end as shown. The outer end of the bore 14 extends through an outwardly extending boss 17 the outer periphery of which is provided with threads 18. The inner periphery of the bore 14 is relieved to provide a seat for gasket 19. The body thus formed is preferably fabricated from die cast aluminum and has a diameter of approximately 6.974 inches and an overall height of about 5.5 inches excluding the boss 17.

To the body thus formed, there is attached a fuel sedimentation or expansion bowl designated generally by the numeral 21 and including a preferably transparent bowl 22 fabricated from an appropriate synthetic resinuous material so as to provide an open upper end 23 and a closed bottom end 24 through which is formed a drain aperture 26 normally kept sealed by an appropriate plug 27. The upper open end 23 of the transparent bowl is provided with a radially outwardly extending flange 28 adapted to be caught by a clamp ring 29 secured to the bottom wall 6 of the body member by appropriate screws 31. To seal the union between the open upper edge of the transparent bowl and the bottom surface 32 of the bottom wall 6, the bottom wall is formed with an annular groove 33 within which is trapped a seal ring 34 which lies disposed between the bottom wall 6 and the upper edge of the bowl 22. The union between these two members is thus sealed fluid-tight.

Within the bowl 21, there is provided means for causing expansion of the fuel as it is discharged into the bowl in a substantially laminar flow. Such means includes a baffle system including baffle member designated generally by the numeral 36 and including a cylindrical portion 37 having an open upper end threaded to engage the threads 18 formed on the outer periphery of the boss 17, and at its lower end flaring out in a skirt portion 38 as shown. There is also provided an inner member 39 having a central support structure 41 from which radiate rib structures 42 which project about a generally conical member 43 the inner surface 44 of which is held spaced from the undersurface 46 of the skirt portion 38 so as to provide passageways therebetween defined between the surfaces 44 and 46 and between successive radiating ribs 42.

The central support structure 41 as shown lies disposed within the cylindrical portion 37 of the baffle assembly 36, and provides a seat 47 on which rests a spherical ball 48 adapted under proper circumstances to be elevated into and seal the opening of bore 14 by seating against the seal ring 19 as will hereinafter be explained. The proportions of the spherical ball 48, the height of the seat 47 below the seal ring 19, and the diameter of the inner periphery of the cylindrical portion 37 cooperates to maintain the spherical ball 48 centrally disposed within the cylindrical member 37 at all times.

To admit diesel fuel into the cup-like body 2 and the expansion chamber 21, the upper open end of cup 2 is provided with a cover plate or cap designated generally by the numeral 51 and comprising a generally flat circular member 52 fabricated preferably from die cast aluminum. The cap forms a fuel-tight cover for the cup-shaped body 2, and for this purpose is provided with an inner surface 53 on which is formed an axially extending circular flange or rib 54 centrally grooved to receive a seal ring 56, the groove forming the annular channel to receive the seal ring 56 and being provided with tapered sidewalls complementary to the tapered sidewalls of the wall 3. Thus, when the cover 51 is placed over the open end of the cup-shaped body 2, the interior 57 of the cup-shaped body is completely sealed around its open upper edge 7.

Centrally of the cover 51, there is provided an integral and centrally disposed inwardly extending boss 58 including a portion 59 that extends inwardly below the inner surface 53 of the cover. The boss is bored to provide an inner periphery 61 which forms a bearing surface for a handle assembly designated generally by the numeral 63, a transverse lever 64, a gasket 66, and an inwardly projecting fluid delivery section 67 provided with a central bore 68 having a transverse aperture 69 extending radially therefrom and communicating with an annular channel 71 formed around the outer periphery of the fluid delivery section 67. Thus, with the handle assembly mounted as shown, the annular passageway 71 communicates with the interior bore 68, and communicates additionally with the inlet passage 72 formed to extend radially to the right as viewed in FIG. 1 and extending through the body of the cover 51. The outer end of the bore 72 is provided with appropriate threads 73 to accept the usual fitting for mounting the unit in a fuel system.

The cover 51 is also provided with an outlet bore or passageway 74 that extends radially outwardly from the central boss 58, is axially aligned with the inlet bore or passageway 72, and lies at the same level thereof through the cover 51. As with the inlet opening 73, the outlet opening is provided with threads 76 to which may be attached an appropriate fitting for mounting the unit in the fuel line. As seen in FIG. 1, access of fuel to the outlet passageway 76 occurs through an aperture 77 formed outboard from the boss 58, the aperture being proportioned in size so that it will easily pass as much fuel as the outlet passageway 74 will carry.

The inner end of the central body portion 63 of the handle assembly that projects beyond the inner end of the boss portion 59, is provided with an appropriate groove 81 adapted to receive a split snap ring 82 between which and the inner end 83 of the boss 59 there is compressed a gasket 84, retained in compressed position by a metal washer 86 and a spring 87 so that the union between the inner peripheral surface 61 of the cover and the fluid delivery body 67 of the handle assembly is sealed in a fluid-tight manner.

Within the handle assembly, the lower end of the fluid delivery section 67 embodying the bore 68, is enlarged in diameter to provide threads 88 to which is secured the inner end of a fuel delivery conduit 89. The lower end of the fuel delivery conduit is threaded and is engaged with the threads 16 formed in the inwardly projecting boss 13 of the body as shown.

From the foregoing it will be seen that fuel admitted through the passageway 72 passes through the central bore 68 in the rotatable handle assembly, passes through the conduit 89 forming the passageway 91 therethrough, passes through bore 14 and passes downwardly and outwardly through the baffle assembly 36 and fills the sedimentation or expansion bowl 21. Any air that is entrained with the fuel rises as bubbles and impinges a downwardly extending conical baffle 92 having its large diameter end trapped between the end wall 6 of the cup like body and the upper edge of the bowl assembly 21 as shown. The truncated apex end 93 of the baffle surrounds the generally cylindrical baffle assembly 37 and is spaced therefrom to provide a passageway 94 through which the fuel may rise upwardly through the apertures 8 in the bottom walls 6 of the central body. It should be noted that because of the upward inclination of the baffle 92, air bubbles that are entrained in the fuel impinge the sloping surface of the baffle 92 and pass upwardly and to the right and are generally trapped in the bight formed between the base of the baffle 92 and the cylindrical wall of the bowl assembly.

To effect filtering of the fuel that passes through the apertures 8 and the bottom wall 6, there is provided within the hollow interior 57 of the body a filter assembly designated generally by the numeral 96 and including a filter element 97 of conventional type having an inner periphery 98, an upper end 99, a lower end 101 and an outer periphery 102. As shown, the upper end 99 of the fuel filter element is trapped in an annular channel formed in the outer peripheral portion of a metallic annulus 103 having an outer peripheral flange 104, an inner peripheral flange 106 and a re-entrant rib 107 that cooperates with the outer peripheral flange 104 to define the channel within which the upper end 99 of the filter element is trapped. The inner peripheral flange 106 is proportioned in diameter to cooperate with the curved surface 108 of a lug 109 formed on the inner surface 53 of the cover and which snugly abut the inner peripheral surface of the flange 106 when the cover is placed over the open end of the body 2. Preferably, three or four such lugs 109 are provided so that the annulus 103 is accurately centered within the hollow body forming the filter chamber when the cover is placed thereon.

At its lower end, the fuel filter element 96 is supported in an annulus 112 the outer periphery of which is provided with a flange 113 which cooperates with a re-entrant head 114 to provide the channel in which the lower edge portion 101 of the filter element is caught. The inner periphery of the annulus 112 is provided with a plate bracket 116 adapted to receive seal ring 117 which seals the inner periphery of the annulus 112 about the outer periphery 118 of the boss 13. Disposed between the bottom 6 and the undersurface of the annulus 12, is a coil spring 119 which resiliently biases the filter assembly upwardly into resilient sealing engagement with the cover 51. It will thus be seen that fuel passing upwardly through the apertures 8 and the bottom wall 6 passes through the spring 19, circulates around the outer periphery of the fuel filter element, passes radially inwardly through the filter into the chamber 121 defined by the innerwalls 98 of the fuel filter element and then passes upwardly through the aperture 77 and into the outlet passageway 74.

As heretofore explained, because of the laminar flow of the fuel any sedimentation that is carried with the fuel into the sedimentation bowl 21 settles to the bottom of the bowl and any air that is entrained with the fuel passes upwardly and is trapped by the baffle 92.

Despite this precaution, it sometimes happens that air will pass with the fuel into the filter chamber. It is important that such air not be trapped in the upper regions of the fuel filter section for the reason that during operation a surge of fuel through the filter system will pick up portions of this entrapped air and carry it with the fuel into the outlet passageway into the fuel system. When this air reaches the combustion chamber, there is an instantaneous interruption of combustion in the form of a "cough" which can not only damage the engine but which can cause a serious accident if it occurs at a critical time. Accordingly, with the design here presented, discharging the fuel through the outlet 74 at the same level as the inlet fuel 72 causes any such particles of air to be entrained with the fuel as it passes through the aperture 77 and prevents its collection in the upper end portion of the fuel chamber.

Having thus described the invention what is claimed to be new and novel and desired to be protected by letters patent of the United States is as follows:

1. A fuel filter device for diesel fuel comprising:
a main body portion open at one end and having an apertured end wall at the other end, said main body portion constituting a filter chamber;
a fuel expansion chamber attached to the apertured end wall of the main body, said fuel expansion chamber constituting a depressurization zone;
a baffle system enclosed within said fuel expansion chamber to control the flow of fuel therethrough, said baffle system including an upper skirt portion having a central aperture, lower conical portion spaced therebelow, and a plurality of radiate rib structures which project between said upper skirt portion and said lower conical portion to provide passageways between successive radiating ribs through which fuel flows into said expansion chamber is substantially laminar flow so as to separate entrained air, water and solids from said fuel by gravity separation;
a cover plate sealingly engaging the open end of the filter chamber and including inlet and outlet passageways therein at substantially the same level in relation to the filter chamber;
a handle assembly rotatably journaled on the cover plate and including an elongated conduit connecting said inlet passageway with the central aperture in said baffle system within said expansion chamber whereby fuel is caused to flow through said baffle system and into said fuel expansion chamber for depressurization and separation prior to flowing through said filter chamber; and
a fuel filter element disposed within said filter chamber and disposed concentrically about said elongated conduit, said fuel filter being arranged in relation to said filter chamber so that fuel flows from said baffle system upwardly through said apertured end wall of said main body portion, surrounds the exterior of the filter element, and flows radially inwardly through the filter element and thence upwardly through the interior thereof to be discharged directly into said outlet passage, said outlet passage communicating directly with the interior of the filter chamber and the filter element being closed at its end remote from said apertured end wall, whereby the fuel must pass through said filter before reaching the outlet passageway.

2. The combination according to claim 1, in which said fuel filter element is resiliently pressed into sealing engagement with the cover plate within the fuel filter chamber.

3. The combination according to claim 1, in which means are provided on the cover plate depending into the fuel filter chamber to center the fuel filter element therewithin.

4. The combination according to claim 1, in which said handle assembly includes a circular passageway communicating with said inlet passageway to permit the flow of fuel into said elongated conduit in all positions of the handle assembly.

5. The combination according to claim 1, in which said handle assembly is sealingly and rotatably journaled on the cover plate, and means are provided to resiliently retain the handle assembly against the cover plate.

6. The combination according to claim 1, in which said elongated conduit threadably engages the end wall of said main body portion to bind said cover plate, said main body portion and said expansion chamber into a composite fuel-tight unit.

7. The combination according to claim 1, in which said fuel filter element includes a pair of annular end plates adapted to fit across opposite ends of the fuel filter, each said plate having a channel section adjacent its outer periphery in which said fuel filter is seated and having an inner periphery concentrically disposed about said elongated conduit, and means on said cover plate and said apertured end wall cooperating with the inner peripheries of said end plates to center the fuel filter element within the main body portion and fuel filter chamber defined thereby.

* * * * *